United States Patent [19]

Hart

[11] 3,776,647

[45] Dec. 4, 1973

[54] SAFETY GUARD AND DUST AND DEBRIS COLLECTOR ATTACHMENT FOR A DRILL

[76] Inventor: Herman Hart, 1078 N.W. 53rd St., Miami, Fla. 33127

[22] Filed: Aug. 31, 1972

[21] Appl. No.: 285,507

[52] U.S. Cl........... 408/241 G, 408/112, 145/116 A
[51] Int. Cl............................................. B23b 47/00
[58] Field of Search.................... 408/241 G, 241 R, 408/112, 100, 79; 145/116 R, 116 A

[56] References Cited
UNITED STATES PATENTS

| | | | |
|---|---|---|---|
| 1,597,176 | 8/1926 | Bresser | 145/116 R |
| 3,320,832 | 5/1967 | Jensen | 408/112 |
| 3,550,481 | 12/1970 | Jensen | 408/112 |

Primary Examiner—Leonidas Vlachos
Attorney—Gustave Miller

[57] ABSTRACT

This is an attachment for a drill that provides a safety guard, and a dust and debris catcher. It is in the form of a pair of frusto-cones, preferably of stainless steel, removably held in spaced apart relationship by a cylinder of similar material, providing space for the dust and debris to accumulate therebetween. The apexes of the frusto-cones are apertured to permit the drill-bit to extend therethrough. The frusto-cones and cylinder, in turn, are threadedly secured on a telescopic sleeve which is retractable into and between a pair of concentric sleeves, secured together, and mounted on a drill body, fitting over the drill hub, and removably secured to the drill body. A spring about the frusto-cones and the cylinder urges the frusto-cones outwardly and permits the frusto-cones and telescopic sleeve to retract as the drill-bit penetrates the material being drilled. The outer concentric sleeve is apertured to permit ready retraction and prevent pressure building up between the concentric sleeve, and permit suction through the frusto-cone apertures as the drill is removed from the drilled area, thus providing a vacuum cleaner effect about the drill-bit to keep the dust within the frusto-cones as the drill-bit is removed.

To empty the dust, telescoping the male sleeve back and forth will act like a blow-gun and blow out the dust and debris. A drill-bit depth-limiting and depth gauge for the drill, and in another form, a drill depth measuring gauge on the outer surface of the telescopic sleeve, is provided. Should the drill-bit break while in use, the broken parts will be trapped within the frusto-cones or concentric sleeves, preventing any injury or damage.

To prevent the dust from falling out, the drill-bit aperture in the outer cone when drilling downwardly, as in a floor, an internal flared pipe is detachably added to the inside of the outer frusto-cone, just slightly larger than the drill-bit, and has a flared internal flanged lip so that the major part of the dust will collect within the outer cone.

11 Claims, 6 Drawing Figures

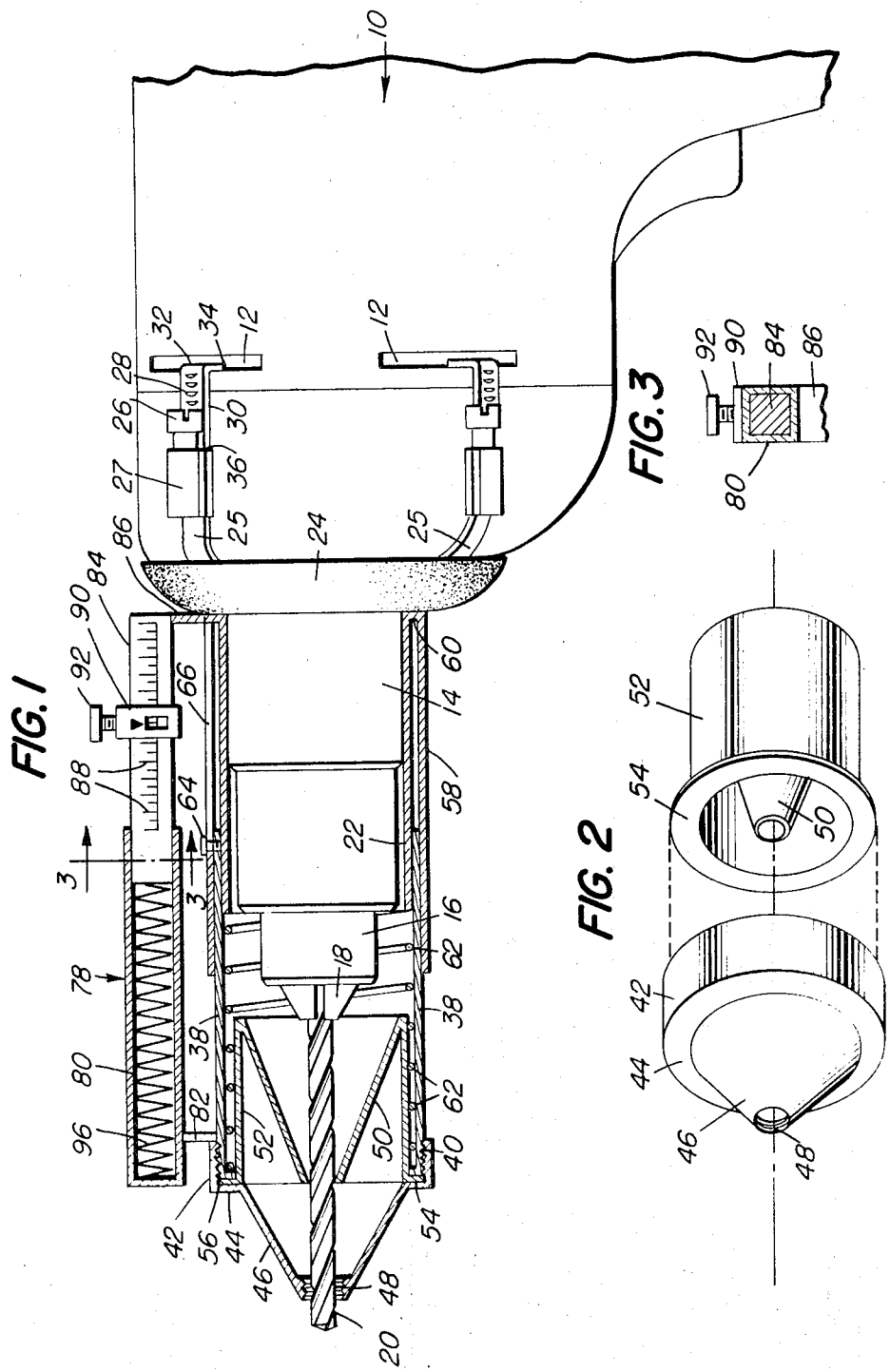

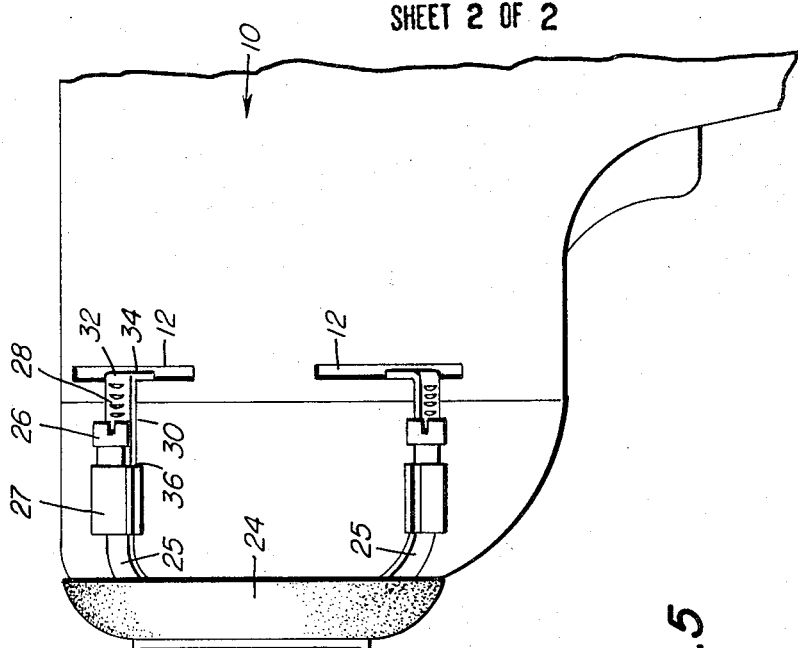
FIG. 4
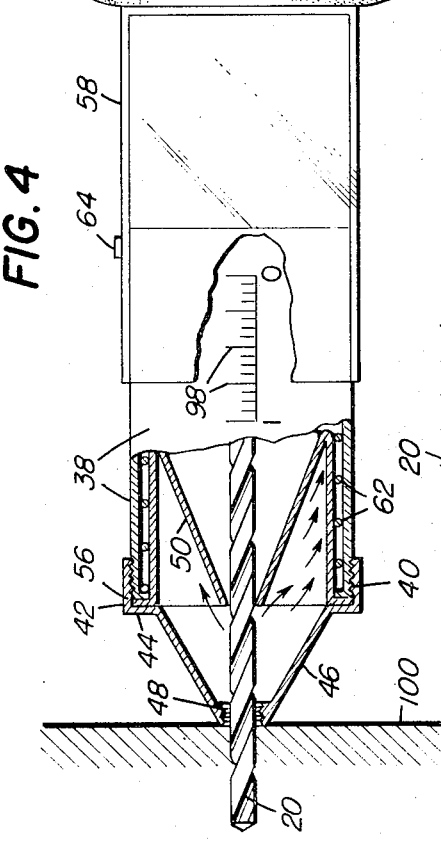
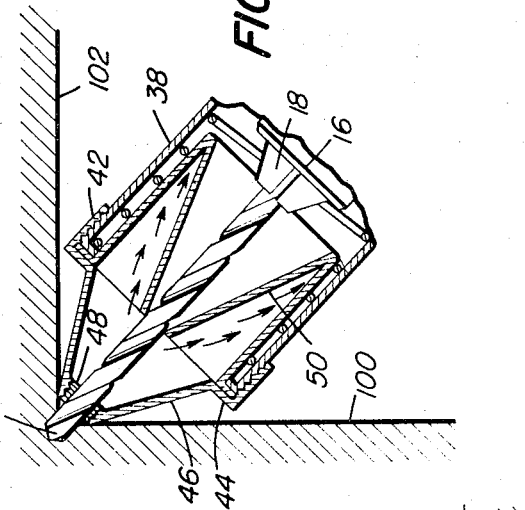
FIG. 5
FIG. 6

SAFETY GUARD AND DUST AND DEBRIS COLLECTOR ATTACHMENT FOR A DRILL

BACKGROUND OF THE INVENTION

Using a drill for drilling holes in various types of material, wood, metal, concrete, etc., is often unsuspectedly dangerous, even more so among amateur drillers in the home than with professional or industrial drillers doing so in construction and other types of commercial drilling in and about building, because of the face that the dust and debris are dangerous in causing injury to the driller, through flying debris and dust, polluting the air being breathed by the operator. It may also cause physical injury to the body or eyes of the operator, with the additional hazard that a drill-bit may, and sometimes does, break and be propelled into the eye or other parts of the body of the operator. Also, the dust and debris are difficult to clear up, especially in a furnished house.

OBJECTS OF THE INVENTION

It is an object of this invention to diminish the hazards of operating a home or industrial drill, to eliminate the danger of drill dust or drill debris from polluting the atmosphere of the operator or of the home, and also eliminate the danger that a broken drill-bit may fly into the eye or body of the drill operator, a danger greater with the amateur driller than with the professional driller because of the fact that the amateur driller often uses low cost drill-bits which are often of poorer quality, and which are more likely to break in use and injure the operator. It is also an object to improve over U.S. Pat. Nos. 1,981,570; 2,461,716; 2.625,062 and 3,583,821.

A further object of this invention is to provide a dust and debris catcher and safety guard attachment which acts as a vacuum cleaner in drawing most, if not all, of the dust and debris therein for later removal, and, at the same time, protects the operator from flying particles of dust or debris, as well as from flying pieces of a broken drill-bit.

Yet a further object of this invention is to provide an additional attachment for catching the majority of the dust and debris created in drilling vertically downward, while the minority uncollected dust is left usually in a ring surrounding the drilled hole.

A further object of this invention is to provide a depth gauge indicator showing just how far the drill-bit has penetrated, and in a modified form a depth gauge limit attachment which, in addition to showing how far the drill has penetrated, is adjustable to limit the drill penetration to any desired depth.

BRIEF DESCRIPTION OF THE FIGURES

With the above and related objects in view, this invention consists in the details of construction and combination of parts, as will be more fully understood from the following description, when read in conjunction with the accompanying drawings, in which:

FIG. 1 is a sectional view of this drill attachment, including a drill depth gauge and adjustable drill depth limiting device, mounted on a drill.

FIG. 2 is an exploded perspective view of the dust - collecting frusto-cones and spacing cylinder.

FIG. 3 is a section on line 3—3 of FIG. 1 through the depth limiting gauge.

FIG. 4 is an elevational view, partly broken away in section, with a depth gauge delineated thereon, mounted on a drill, in the act of drilling in a vertical wall.

FIG. 5 is a broken away section showing the act of drilling in a corner between a wall and a ceiling.

FIG. 6 is a broken away section of the invention, with an added internal dust and debris deflector attachmant, for drilling downwardly into a floor.

DETAILED DESCRIPTION OF THE INVENTION

There is shown at 10 a conventional drill having the usual ventilating slots 12 for the drill motor (not shown) therein. Extending from the drill 10 is the shaft casing 14 at the end of which is provided the usual chuck 16 and adjustable chuck jaws 18 for securing a drill-bit 20 extending therefrom, all in a conventional manner.

Frictionally retained or secured on the shaft casing 14 is a female first cylindrical sleeve 22, fitting somewhat snugly thereon, and provided with a rubber or plastic compressible washer 24. Instead of relying on frictional retainment, mechanical retaining means may be provided in the form of clamp fingers 25 which extend through the washer 24 and are permanently secured to the sleeve 22. There are four clamp fingers 25, one for each of the four ventilating slots 12. Each clamp finger 25 has a screw housing 27 in which is rotatably mounted a screw 26 having its threads extending into angular parallel screw thread receiving slots 28 of a clamp toe 30. One end 32 of the clamp toe is bent into an end hook 34. The other end 36 slidably extends through the screw housing 24 with its parallel slightly angular slots 28 sucessively engaged by the threads of the screw 26, so that rotation of the screws 26 tighten the clamps to hold this drill attachment mounted on the drill 10, while rotation of the screw 26 in the opposite direction permits this attachment to be removed.

The structure of the clamps is identical with a popular hose clamp (one being made by Ideal Corp., Brooklyn, N.Y., with the T.M. "Hy Gear"), where the screw is rotated to clamp a hose on a pipe end. In this case, the adjustable clamp ring is cut into two pieces, one piece providing the clamp finger 25 and the other piece providing the clamp toe 30 and end hook 34.

Telescopic extendable about the first cylindrical sleeve 22 is a second or male cylindrical sleeve 38, the outer end being threaded at 40 for detachably securing thereon a collar 42 integrally connected by a flange 44 to a frusto-cone 46. A threaded apex opening 48 is provided at the narrow end of the frusto-cone 46, of a diameter not more than four times the diameter of the drill-bit 20 that is to extend therethrough, A second apertured frusto-cone 50 having a cylinder 52 integrally connected thereto has an outwardly extending flange 54 which is held between the flange 44 and the edge 56 of second cylindrical sleeve 38. A third cylindrical concentric sleeve 58 spaced from first sleeve 22 by the thickness of the second or male telescoping sleeve 38 may be provided, connected by flange 60 to the first sleeve 22. A coiled spring 62 is provided between sleeve 38 and frusto-cone cylinder 52 and is biased between flange 54 and the end of male sleeve 38. To prevent the spring 62 from separating the assembled frusto-cones and male sleeve 38 from the female sleeve 22, any suitable means may be provided, such as a threaded pin 64 extending through a slot 66 in outer female sleeve 58 into the inner female sleeve 22. This slot 66 also prevents pressure build-up between the female sleeves.

As shown in FIG. 6 only, a small pipe 68 threaded at 70, or possibly provided with a threaded rubber tip, co-operates with the threads 48 of frusto-cone 46. The pipe 68 fits somewhat loosely over the drill-bit 20. It is outwardly flared at its inner end at 72, and is a detachable attachment to be added when drilling downwardly, as into a floor 74, so that most of the dust and debris will be trapped within the frusto-cone 46, as shown by the arrows 76, while a small portion of the dust will collect on the floor about the drilled hole.

In FIG. 1, one form of gauge 78 is shown. The gauge 78 is also an adjustable drill penetration stop limiting means. It consists of a hollow receptacle 80 mounted on a stanchion 82 on the outside of telescoping male sleeve 38, and a telescoping rod 84, mounted by a stanchion 86 on the outer female sleeve 58 (or the inner sleeve, if the outer one is not present). The rod 84 is graduated at 88 so as to indicate the drill penetration as the graduated rod 84 has the receptacle 80 telescope thereover. A stop collar 90 slidable thereover is adjustably secured along its length by a thumb-screw 92 and will abut the entrance end of receptacle 80 and limit the penetration of the drill-bit 20 to the set distance.

If desired, a coil spring 96 may be located within the receptacle 80 to urge the rod 84 outwardly, but as this only supplements the action of coil spring 62, coil spring 96 may be omitted, and, in addition, the opposite end of the receptacle 80 may be left open, permitting the rod 84 to reciprocate freely therewithin.

In the form of FIG. 4, the depth indicator gauge is in the form of graduations 98 on the telescopic male sleeve 38 and the end of outer female sleeve 58 acts as an indicator cooperating with the graduations 98 to show how deep the drill-bit 20 has penetrated. The frusto-cones 46 and 50, and their attached sleeves and flanges, will preferably be made of stainless steel, or other suitable materials, and likewise the flared attachment pipe 68 so as to have enough strength to contain the drill-bit 20 should it break or disintegrate while in operation. The three sleeves 22, 28 and 58 may be of similar material, or of hard transparent smooth plastic, if desired.

OPERATION OF THE INVENTION

This invention is principally for the purpose of providing a safety guard to prevent broken drill-bits 20 or dislodged debris or dust from injuring the body of the operator or his eyes, as well, should he fail to wear protective goggles, which the average home operator seldom uses. It also serves to collect the dust and debris, as shown by the arrows in FIGS. 4, 5 and 6, making clean-up after the drilling operation much easier. As the drilling operation is performed on a vertical wall 100, as in FIG. 4, or a wall 100 and ceiling corner 102, as in FIG. 5, the dust is trapped between the frusto-cones 46 and 50 within the frusto-cone cylinder 52, and, when the drill-bit 20 is withdrawn from the aperture it has drilled, it may be held over a trash receptacle, the dust and debris may be discharged from between the frusto-cones by working them back and forth, causing air about the drill chuck 14 to compress through the frusto-cone openings and below the dust out into the trash receptacle. By doing this after a number of holes have been drilled, the dust and debris are collected and disposed of and the area is kept generally clean of such dust and debris. It is the frusto-cone shape that permits drilling in a corner, as between wall 100 and ceiling 102. In drilling a floor, as in FIG. 6, some of the dust and debris, probably about one-fourth, will collect about the drilled hole when the flared pipe 68 has been attached, thus reducing the amount of dust that has to be swept up after the drilling operation. Meantime, the operator is protected against flying debris or broken drill-bits when used as herein set forth.

ABSTRACT OF THE DRAWINGS

In the drawings, like numbers refer to like parts, and for the purposes of explication, set forth below are the numbered parts of the improved Safety Guard Dust and Debris Catcher Drill Attachment.

10 conventional drill
12 ventilating slots
14 shaft casing
16 chuck
18 adjustable chuck jaws
20 drill-bit
22 female first cylindrical sleeve
24 compressible washer
25 clamp finger secured to sleeve 22
26 rotatable screw in 27
27 screw housing
28 angular parallel screw thread receiving slots
30 clamp toe
32 hook end of 30
34 hook on end of 32
36 other end of clamp toe 30
38 male second cylindrical sleeve
40 threads on end of male sleeve 38
42 internally threaded collar
44 flange connecting collar 42 to frusto-cone 46
46 first frusto-cone
48 threaded opening in apex of 46 (for detachably holding flared pipe 68)
50 second frusto-cone (held spaced from first frusto-cone 46)
52 cylinder attached to 50 at one end and to flange 54 at other end
54 outwardly extending flange on 52
56 edge of male second cylindrical sleeve holding flange 54 against flange 44
58 female third cylindrical sleeve
60 flange integrally connecting sleeves 58 and 38 together
62 coil spring biasing male sleeve 38 outwardly from sleeves 22 and 58
64 threaded pin
66 slot
68 down drilling dust catching pipe
70 threads on 68
72 outward flare on 68
74 floor being drilled
76 dust arrows about 68
78 drill-bit penetration gauge and stop limiting mens, FIG. 1.
80 hollow gauge receptacle
82 stanchion supporting 80 on male sleeve 38
84 telescoping gauge rod
86 stanchion supporting rod 84 on outer female sleeve 58
88 graduations on rod 84

90 stop collar on 84
92 securing screw through collar 90
96 optional coil spring within 80
98 graduations forming gauge on male sleeve 38
100 vertical wall
102 ceiling Although this invention has been described in considerable detail, such description is intended as being illustrative rather than limiting, since the invention may be variously embodied.

Having thus set forth the nature of this invention, what is claimed is:

1. A safety guard and dust and debris collector attachment for a drill (10) comprising a first cylindrical sleeve (22) adapted to fit over the drill shaft casing (14), a second cylindrical sleeve (38) telescopic over said first sleeve (22), an inner frusto-cone (50) and an outer frusto-cone (46) spaced apart by a cylinder (52), said frusto-cones (50, 46) and cylinder (52) being detachably secured on the outer end (40) of said second cylindrical sleeve (38), said frusto-cones (50, 46) having apex orifices through which the drill-bit (20) may extend, and yieldable means (62) urging said first (22) and second (38) sleeves apart.

2. The attachment of claim 1, and an internal flared pipe (68) detachably secured to and within said outer frusto-cone (46) to trap the major part of the dust and debris within said frusto-cones (50, 46) when drilling in a downward direction.

3. The attachment of claim 1, and a drill-bit (20) depth gauge (78 or 98) on one of said sleeves.

4. The attachment of claim 3, said gauge (98) being delineated on one (38) of said sleeves, said other sleeve (58) providing cooperating gauge indicating means.

5. The attachment of claim 3, said drill-bit (20) depth gauge (78) including drill-bit penetration limiting means (90).

6. The attachment of claim 5, said drill-bit depth gauge (78) and penetration limiting means (90) comprising a graduated gauge rod (24) secured to one said sleeve, a gauge rod receptacle (80) secured on the other said sleeve, and a stop (90) slidable and adjustably securable (92) on said gauge rod (24) and cooperating with said rod receptacle (80) adjustably limiting the entry of said rod (24) into said receptacle (80) and thus limiting the penetration of the drill-bit (20).

7. The attachment of claim 1, and a third cylindrical sleeve (58) secured (59) to and spaced from said first cylindrical sleeve (22), said second sleeve (38) telescoping between said first (22) and said third (58) sleeves.

8. The attachment of claim 1, and means (64,66) preventing accidental separation of said telescopic sleeve (58) and said first sleeve (22).

9. The attachment of claim 1, and means (66) preventing air pressure build-up by said second sleeve (38) between said first (22) and third (58) sleeves.

10. The attachment of claim 1, said attachment being frictionally retained on the drill (10).

11. The attachment of claim 1, and means (25–36) retaining said attachment on the drill (10).

* * * * *